United States Patent [19]

Puchy

[11] 3,930,432
[45] Jan. 6, 1976

[54] FASTENING ASSEMBLY

[76] Inventor: David Peter William Puchy, 24 Threlfall St., Eastwood 2122, New South Wales, Australia

[22] Filed: July 20, 1973

[21] Appl. No.: 380,959

[30] Foreign Application Priority Data
July 21, 1972 Australia.................................. 9789

[52] U.S. Cl. ................................................ 85/53
[51] Int. Cl.² ....................................... A47G 03/00
[58] Field of Search ............ 85/55, 54, 53; 24/90 A, 24/113 R, 113 MP

[56] References Cited
UNITED STATES PATENTS

| | | | |
|---|---|---|---|
| 465,289 | 12/1891 | Platt.......................................... | 85/53 |
| 1,805,937 | 5/1931 | Berge........................................ | 85/55 |
| 1,936,624 | 11/1933 | Gelpcke.................................... | 85/55 |
| 2,214,030 | 9/1940 | Pereles................................ | 24/113 MP |
| 2,334,104 | 11/1943 | Kurzweil et al. ................. | 24/113 MP |
| 3,027,795 | 4/1962 | Spadaro.................................... | 85/53 |
| 3,654,671 | 4/1972 | Berning............................. | 24/113 R |

FOREIGN PATENTS OR APPLICATIONS

| | | | |
|---|---|---|---|
| 1,281,713 | 12/1961 | France................................... | 85/55 |
| 1,397,500 | 3/1965 | France................................... | 85/55 |
| 1,116,444 | 6/1968 | United Kingdom..................... | 85/53 |
| 890,049 | 2/1962 | United Kingdom..................... | 85/53 |

*Primary Examiner*—Edward C. Allen
*Attorney, Agent, or Firm*—Haseltine, Lake & Waters

[57] ABSTRACT

Fastening assembly comprising a base, locking or anchoring element, provided with an upper annular flange, which accepts and engages a removable flexible cap or covering element formed of impermeable elastic material, preferably molded thermoplastic, retained thereon by interference fit. The components when united provide a protective and/or decorative cover for a fastening element that can extend into a sub-stratum, work-piece or material through the base element. The cap and base elements may subsequently be marginally welded together so as to safely house electronic components of telephone or computer systems against unauthorised interference.

4 Claims, 6 Drawing Figures

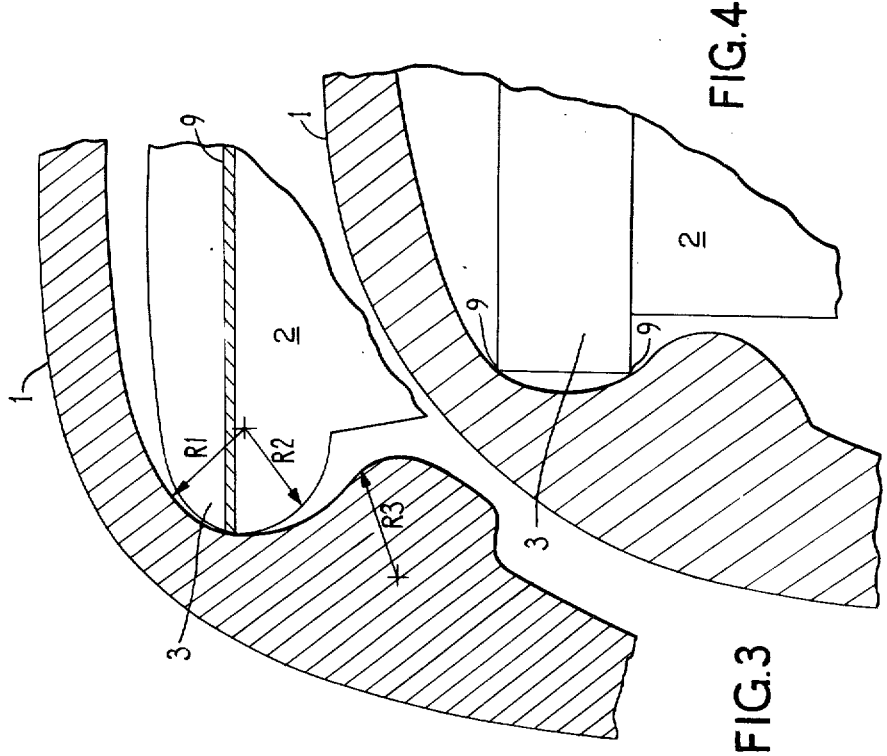
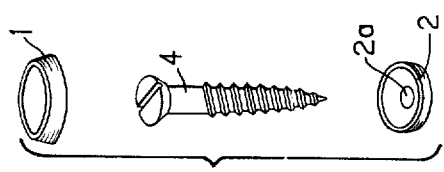

FIG. 6          TABLE 1

| SIZE | A | B | B₁ | B₂ | C | D | E | F | G | H | H₁ | H₂ | J | K | R₁ | R₂ | R₃ | R₄ | R₅ | R₆ |
|---|---|---|---|---|---|---|---|---|---|---|---|---|---|---|---|---|---|---|---|---|
| 3/2 | .325 | .240 | | | .195 | .030 | .030 | .300 | .385 | .130 | .100 | .080 | .007 | .025 | .018 | .015 | .015 | .040 | .375 | .437 |
| 3/3 | .325 | .240 | | | .230 | .055 | .030 | .300 | .385 | .130 | .100 | .080 | .007 | .025 | .018 | .015 | .015 | .040 | .375 | .437 |
| 5/4 | .371 | .266 | | | .256 | .046 | .046 | .346 | .440 | .170 | .135 | .106 | .007 | .025 | .020 | .015 | .018 | .062 | .375 | .437 |
| 5/5 | .371 | .266 | | | .290 | .064 | .046 | .346 | .440 | .170 | .135 | .106 | .007 | .025 | .020 | .015 | .018 | .062 | .375 | .437 |
| 8/6 | .435 | .330 | | .020 | .330 | .064 | .064 | .410 | .520 | .201 | .163 | .133 | .007 | .030 | .020 | .015 | .018 | .062 | .472 | .562 |
| 8/8 | .435 | .330 | | .020 | .343 | .095 | .064 | .410 | .520 | .201 | .163 | .133 | .007 | .030 | .020 | .015 | .018 | .062 | .472 | .562 |
| 12/10 | .555 | .450 | | .018 | .440 | .095 | .095 | .530 | .640 | .240 | .200 | .157 | .009 | .032 | .022 | .015 | .020 | .078 | .625 | .656 |
| 12/12 | .555 | .450 | | .018 | .450 | .143 | .095 | .530 | .640 | .240 | .200 | .157 | .009 | .032 | .022 | .015 | .020 | .078 | .625 | .656 |

FASTENING ASSEMBLY

The present invention relates to a fastening assembly featuring a protective cap, e.g. for screws, bolts and like fastening elements, serving the dual purpose of protecting the fastening elements against corrosion and at the same time providing a decorative effect. Further, the invention relates to an assembly for retaining a screw or bolt in secure relationship to the material in which it is anchored by avoiding loosening under the influence of vibration, in relation to, for example, the trim of motor bodies, reilway carriages and so on.

It has been customary in accordance with prior-art practices for screws, bolts, studs and like fastening elements to be countersunk and covered with sundry preparations which later permit paint or other coatings on the surfaces of panels of, for example, cabinet walls, sectional partitions in office areas, dashboards and trims of transport vehicles, and in relation to chambers utilised in chemical and other industries.

These customary procedures have proved inadequate in a number of different ways. For example, where normal steel or other metal screws or bolts have been employed in a corrosive atmosphere, deterioration of such screws or bolts has proceeded, shortening their useful life. Again where securing elements of the kind indicated are subject to vibration, they have been found to loosen and require periodic tightening. In relation to screw elements such tightening, either with a plain or a cruciform screw-driver, is known to result in burring of the screw-heads, resulting in sharp metal edges which can cause injury or discomfort where contact may be made by persons. In the case of mobile vehicles such contact in the event of a rapid change of velocity can cause injury.

In the case of metal cabinets, inadvertently burred screw or bolt heads may give rise to discomforting cuts or scratches.

Further, in the fields of furniture upholstery, vehicle trimming and in the erection of, for example, office partitions, it is well established that retaining screws or like elements should preserve both the utilitarian and decorative functions.

The inventive decorative covering and retaining elements, formed from any suitable thermoplastic or thermosetting plastic, may be produced in any desired colour or may be plated to suit the decor involved.

Further, the inventive protective covering and retaining elements permit ready adjustment and replacement of screws or like fastening elements and their re-use by virtue of the metal screws being unimpaired by corrosion.

The primary object of the present invention is to provide a novel fastening assembly comprising protective and/or decorative moulded plastic caps and removable locking washers for the protection of metal screws, bolts and the like, adapted for mass production in an economical manner.

A further object of the invention is to replace unsightly cupwasher mounted screws in, for example, building partitioning, curtain walls and framing, and in automotive interior fittings.

Another object of the invention is to provide exchangeable protective caps which may bear impressions of individual insignias in situations suiting the user's personal taste.

An additional object of the present invention is to provide protective caps and retaining washers appropriate for use with fastening elements in general. It is to be appreciated that by adoption of the novel protective cap-washer assembly the need to use expensive fastening elements, plated as protection against corrosion, is avoided with consequent economic advantages.

Other objects and advantages of the invention will be made apparant in the following description:

The fastening assembly in accordance with the present invention essentially comprises an elastic impermeable protective cap formed, e.g. by moulding from synthetic thermoplastic material, co-operatively but removably engaging a locking element by snap engagement, securing an interference fit between an annular flange or rim of the locking element and the elastic protective cap.

The invention also includes a locking element and protective cap adapted for use as a garment button, by virtue of the locking element being stitched to a fabric or like material, and the protective cap fitting over the annular rim of the locking element.

The invention is now fully described in relation to one preferred, exemplary embodiment illustrated in the accompanying drawings.

In the drawings:

FIG. 1 is an exploded perspective view of the components of applicant's cap-washer-type fastening assembly in relation to a screw bolt, stud or like fastening element;

FIG. 3 is a part sectional view (enlarged scale) showing a single sealing rim between the cap and washer elements;

FIG. 4 is a similarly enlarged view illustrating a square-shouldered washer element achieving a double sealing rim in contact with the cap; FIG. 6 illustrates Table 1 of values relative to the dimensions shown in FIG. 2.

The applicant's cap-washer assembly consists essentially of a cap element 1 and a locking or washer element 2 which engage together by snap engagement when the cap element is pressed over the upper annular flange or rim 3 of the washer element.

Figure 5:
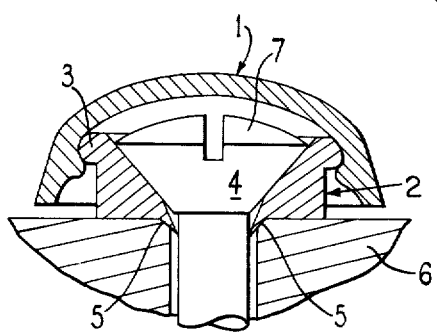
FIG. 5 shows in a sectional view the deformation of the washer element during locking engagement between a fastening element and a work-piece to which the same is applied.

Referring particularly to FIG. 1 of the drawings the mode of assembly of the applicant's assembly is now described. The washer element 2 is located against a work surface (as shown in FIG. 5 at 6) and a fastening element 4 is driven through a preferably central aperture 2 of the washer element into the work material. More apertures will be discussed later.

It is to be observed that the internal margin of the washer element is deformed by pressure asserted by the shank of the fastening element as will be explained, and extends to a degree into the work-piece, thereby locking the fastening element so as to withstand loosening as for example by vibration. With more particularity reference is made to FIG. 5 of the accompanying drawings which shows an extending nib 5 of the internal margin of the washer element 2, extending into a workpiece 6, holding the fastening element 4 securely against loosening.

The resilient impermeable cap element 1 fits over the annular flange 3 of the washer element, securing an interference fit along a narrow zone of the peripheral contact between the elements 1 and 3.

Figure 2:
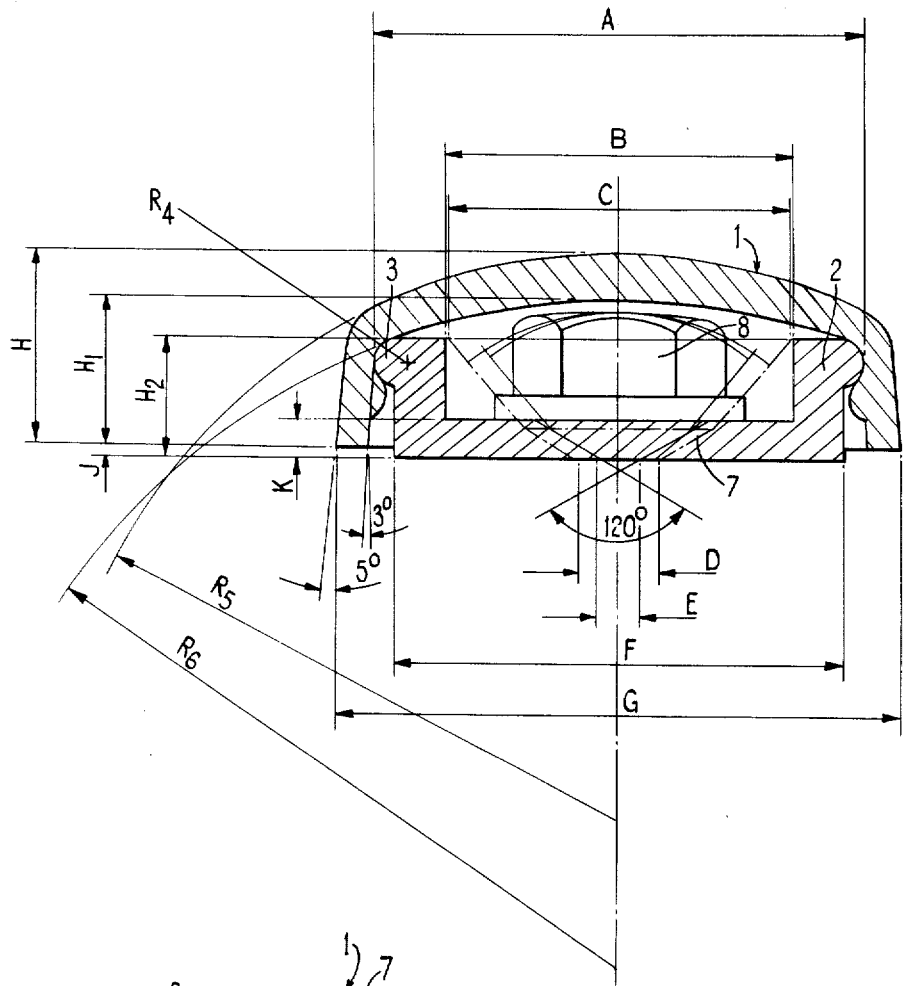
FIG. 2 is a sectional view of the assembly, also indicating two types of bolt or screw.

Referring more particularly to FIG. 2 it will be appreciated that the applicant's cap-washer assembly admits and encases all conventional types of heads of fastening elements. As a matter of example, in FIG. 2 of the drawing a flat-headed screw 7 and a bolt head 8 are shown.

It is to be appreciated that the interference fit between the cap and washer elements 1, 2 involves the maintenance of accurate tolerances coupled with quality control of the components. For the purposes of retaining an effective seal between the assembly elements, the interference is preferably of the order of ten thousandths inches per inch. However, the desired retention of the seal may be achieved with tolerances within the range of 2 to 20 thousandths inches per inch.

FIG. 2 of the drawings graphically illustrates examplary details of sizes of cap-washer assemblies conforming to recognised British gauge sizes of fastening elements. For purposes of interpreting FIG. 2 of the drawings reference is made to Table 1.

Reference is now made to FIGS. 3 and 4 of the drawings which show the fundamental cap-washer assembly, the latter figure having a single sealing rim 3 and two sealing zones 9 so that the modified square-shouldered washer component 2 achieves a double sealing effect.

In FIG. 3 the radii $R_1$ $R_2$ $R_3$ set out in Table 1 are more clearly shown, having reference to the conformation between the cap and washer elements 1, 2, also illustrated in FIG. 2. It is to be understood that the radii are explanatory and may be varied, always provided that the applicant's interference fit is achieved.

It is to be observed that the cap component 1 is generally of convex or outwardly curved shape. This outward curvature facilitates application of the caps to engage with the washer components 2 in a clip-on manner. It will be evident that both cap and washer, by virtue of their elasticity, can tolerate distortion of shape while being fitted, provided that such distortion is always within the elastic limits of the components.

It is to be appreciated that the inventive cap and washer assembly may be modified by forming the washer with two or more small apertures, in place of the single aperture illustrated, thereby permitting the washer to be sewn to a fabric as a button, and the cap can then be engaged over the washer achieving a decorative button assembly.

Furthermore, the cap may be covered with a suitable piece of fabric or other sheet material and clipped on the modified washer, forming its base portion, to provide a readily achieved cloth-covered button matching any desired background.

In connection with the protection of fastening elements in a corrosive environment the inventive assembly elements may, additional to their inherent interference fit, be permanently united. This effect may be readily secured, for ex., by spin welding the cover and washer elements around their external common margin.

Welding of the elements achieves substantial utility in protecting telephonic installations computer, channels and other equipment from tampering by unauthorised persons. It will be evident that a permanently sealed protective cover could not be undone without revealing that interference had been undertaken, and thereby alerting those responsible for security of equipment of the kind indicated.

TABLE 1

| SIZE | A | B | C | D | E | F | G | H | $H_1$ | $H_2$ | J | K | $R_1$ | $R_2$ | $R_3$ | $R_4$ | $R_5$ | $R_6$ |
|---|---|---|---|---|---|---|---|---|---|---|---|---|---|---|---|---|---|---|
| 3/2 | .325 | .240 | .195 | .030 | .030 | .300 | .385 | .130 | .100 | .080 | .007 | .025 | .018 | .015 | .015 | .040 | .375 | .437 |
| 3/3 | .325 | .240 | .230 | .055 | .030 | .300 | .385 | .130 | .100 | .080 | .007 | .025 | .018 | .015 | .015 | .040 | .375 | .437 |
| 5/4 | .371 | .266 | .256 | .046 | .046 | .346 | .440 | .170 | .135 | .106 | .007 | .025 | .020 | .015 | .018 | .062 | .375 | .437 |
| 5/5 | .371 | .266 | .290 | .064 | .046 | .346 | .440 | .170 | .135 | .106 | .007 | .025 | .020 | .015 | .018 | .062 | .375 | .437 |
| 8/6 | .435 | .330 | .330 | .064 | .064 | .410 | .520 | .201 | .163 | .133 | .007 | .030 | .020 | .015 | .018 | .062 | .472 | .562 |
| 8/8 | .435 | .330 | .343 | .095 | .064 | .410 | .520 | .201 | .163 | .133 | .007 | .030 | .020 | .015 | .018 | .052 | .472 | .562 |
| 12/10 | .555 | .450 | .440 | .095 | .095 | .530 | .640 | .240 | .200 | .157 | .009 | .032 | .022 | .015 | .020 | .078 | .625 | .656 |
| 12/12 | .555 | .450 | .450 | .143 | .095 | .530 | .640 | .240 | .200 | .157 | .009 | .032 | .022 | .015 | .020 | .078 | .625 | .656 |

The measurements given in Table 1 that apply to both the cap element 1 and the locking or washer element 2 are:

A is the major diameter of the locking element, and also the inner diameter of a re-entrant portion of the cap element in the range of the flange 3;

J is the difference in height between the bottom edges of the two elements when engaged.

Additional dimensions of the cap element are as follows:

G major outer diameter
H overall height
$H_1$ inner height
$R_3$ rounding-off arc below the re-entrant portion (see FIG. 3)

$R_5$, $R_6$ outer and inner arc curvatures of the top portion of the cap element.

Finally, measurements applicable to the locking element are:

B diameter of inner flat-bottom recess
C major diameter of countersunk recess
D, E larger and smaller diameters of bores for a countersunk locking element
F is the outer diameter of the locking element below the flange 3
$H_2$ overall height
K thickness of bottom portion
$R_1$, $R_2$, $R_4$ rounding-off arcs in the flange area (see also FIG. 3).

It should be understood that for each washer size, the exterior form is constant but the internal recess (dimensions B, C, etc.) can be molded to suit different countersunk sizes, and preferably one flat-bottom size. These recesses are shown in FIG. 2: the flat bottom is outlined by hatched lines; the larger of the two countersunk sizes is denoted with dot-dash lines; and the smaller countersunk size by a light continuous line.

I claim:

1. In a fastening assembly comprising an apertured locking element engageable by an extraneous fastening member passed therethrough, such as a screw, bolt and the like, for attachment of said locking element to a sub-stratum; a cap element larger than said locking element for superposition on the latter least one of said elements being formed of resilient material; and cooperative interengaging means provided respectively on outer and inner portions of said locking and said cap elements to facilitate detachable snap engagement between said elements with an interference fit, said cooperative means including on said locking element an annular ring-shaped flange, the improvement comprising: said ring-shaped flange having a convexly-curved circumferential surface in the plane of the longitudinal central axis of said fastening assembly, said cap element being hollow and having a concave portion in which the radius of curvature is greater than the radius of curvature of the convexly-curved circumferential surface of said ring-shaped flange in the plane of said longitudinal axis so as to form an interior cavity having a major diameter, with the space within the interior surface portion of said concave portion having a minor diameter less than that of the outside diameter of said ring-shaped flange of the locking element, the convexly-curved annular surface of said flange having a maximum diameter greater than said major diameter so as to provide said interference fit, said flange portion annularly engaging said cap element within said cavity but being displaced from said minor diameter thereof so as to provide an annular sealing line extending between said ring-shaped flange and said interior cavity at said major diameter through radial forces being produced by said interference fit; and said cap element having an annular depending skirt portion encompassing said locking element in spaced relationship therewith, said skirt portion being of a length so as to allow a gap between the bottom thereof and the sub-stratum when said cap element is superposed on said locking element.

2. The improvement in a fastening assembly as defined in claim 1, wherein said cap element has a concave-convex portion in which the radius of curvature of the concave portion is greater than the radius of curvature of the convex portion, so as to form at least one other adjoining portion of the cap element.

3. The improvement in a fastening assembly as defined in claim 1, wherein said locking and said cap elements are resilient while the extraneous fastening member is substantially rigid, being passed through the aperture of said locking element, and wherein said skirt portion of the cap element and peripheral portions of said locking element, below said ring-shaped flange thereof, define a gap sufficient to allow expansion of said resilient locking element toward and into the interference fit with said cap element, when the fastening member is tightened against the sub-stratum through said aperture in said locking element.

4. In a fastening assembly comprising an apertured locking element engageable by an extraneous fastening member passed therethrough, such as a screw, bolt and the like, for attachment of said locking element to a sub-stratum; a cap element larger than said locking element for superposition on the latter least one of said elements being formed of resilient material; and cooperative interengaging means provided respectively on outer and inner portions of said locking and said cap elements to facilitate detachable snap engagement between said elements with an interference fit, the improvement comprising: said cooperative means including on said locking element an annular ring-shaped flange having an essentially cylindrical surface extending in parallel with and concentricaly about the longitudinal central axis of said fastening assembly; said cap element being hollow and having a concave portion of a predetermined radius of curvature in the plane of said longitudinal axis so as to form an interior cavity having a major diameter, with the space within the interior surface portion of said concave portion having a minor diameter less than that of the outer diameter of said ring-shaped flange of the locking element, said flange having the cylindrical outer diameter thereof dimensioned so as to annularly engage said cap element in said interference fit within said cavity along two axially spaced circumferential edges of said cylindrical surface but being displaced from said minor diameter thereof so as to provide two axially spaced annular sealing lines extending between the edges of said cylindrical surface of said flange and said cavity through radial forces being produced by said interference fit; and said cap element having an annular depending skirt portion encompassing said locking element in spaced relationship therewith, said skirt portion being of a length so as to allow a gap between the bottom thereof and the sub-stratum when said cap element is superposed on said locking element.

* * * * *